United States Patent [19]
Tracy

[11] Patent Number: 5,789,051
[45] Date of Patent: Aug. 4, 1998

[54] PERFORATED STOCK FOR LABELING CD-ROM JEWEL CASE

[76] Inventor: Peter Tracy, 170 Barker Hill Rd., Guilford, Conn. 06437

[21] Appl. No.: 743,905

[22] Filed: Nov. 4, 1996

[51] Int. Cl.$^6$ .................................................. B32B 3/10
[52] U.S. Cl. .............................................. 428/43; 428/167
[58] Field of Search .......................... 428/43, 167; 281/2, 281/5

[56] References Cited

U.S. PATENT DOCUMENTS

| | | | |
|---|---|---|---|
| 4,084,015 | 4/1978 | Patterson | 428/43 |
| 5,334,432 | 8/1994 | Long | 428/43 |

*Primary Examiner*—Alexander Thomas
*Attorney, Agent, or Firm*—Milde, Hoffberg & Macklin, LLP

[57] ABSTRACT

A sheet having a defined pattern of reduced strength, allowing separation along said defined pattern, said pattern defining an insert for a CD-ROM jewel case, preferably being a letter size paper sheet, comprising a pair of said defined patterns each being an identical and symmetrically arranged rectangular perforation pattern having dimensions of about 150 mm by 117.5 mm, having a pair of scored folding lines to provide three regions of each defined pattern, two lateral regions each being about 6 mm wide by 117.5 mm long and bounded interiorly by one of said folding lines and a central region being about 138 mm by 117.5 mm and being bounded by both of said folding lines. Also provided is a sheet having a defined pattern of reduced strength, allowing separation along said defined pattern, said pattern defining a booklet for a CD-ROM jewel case, which preferably includes a centered rectangular perforation pattern having dimensions of about 119.5 mm wide by 241 mm long, having a scored folding line to provide two regions each being about 119.5 mm wide by 120.5 mm long.

19 Claims, 2 Drawing Sheets

PERFORATED STOCK FOR LABELING CD-ROM JEWEL CASE

FIELD OF THE INVENTION

The present invention relates to the field of perforated sheet suitable for use in a computer printer, and more particularly, to a perforated sheet designed to label a CD-ROM jewel case.

BACKGROUND OF THE INVENTION

The proliferation of compact disks (discs), also known as laser disks, in the form of music as well as CD-ROM products has become extensive. In recent years, recordable compact disks such as those produced by SONY, 3M, and KODAK have grown in popularity. Further, these disks are being used for archival data storage, immediate distribution of data, and for demonstration purposes.

With this recent use has grown a need to label these disks and their storage containers once they have been produced. The assignee of the present invention produces a product known as "Neat-O", which centers a self-adhesive label on a CD-ROM before contact, and thus allows a label to be custom printed and then near-perfectly applied. However, the CD-ROM is than placed in a so-called jewel case, which must also be labeled, particularly if the disk is obscured. While manufacturers of large numbers of identical disks have their labels or identifying information lithographed, this method is impractical for short runs of disks.

Ink markers may also be used to label jewel cases, but this manual method lacks precision.

SUMMARY AND OBJECTS OF THE INVENTION

It is therefore an object of the invention to provide a die perforated sheet or set of sheets which are suitable for labeling of a CD-ROM jewel case. By providing a standard sheet, edges need not be manually cut for each label, and standard letter size sheets may be provided for use in standard laser printers, ink jet printers, and copying devices. After printing, these sheets are torn along the perforation and inserted in the jewel case. The quality of presentation is then limited only by the quality of the printing operation.

A preferred sheet has perforated margins outlining a pair of jewel case face inserts for the front and rear casing, and which may be printed on both sides. The preferred size is 138 mm wide, with a 6 mm wide "wing" on each side separated from the body of the face insert by a crease line. Each insert is preferably 117.5 mm high.

A jewel case also includes a booklet, which is inserted inside the front face insert and above the disk. The present invention therefore also provides a preperforated and scored booklet having a width of 119.5 mm and a height of 241 mm, scored 120.5 mm from the top for controlled folding. This booklet may also be printed on both sides.

The perforations are preferably of a type known as "microperforation", which leave a relatively clean edge and do not disrupt the operation of a laser printer or other type of printing or copying device, such as an ink-jet printer or photocopier. These perforations need not end at the corners of the insert, and for example may extend to the edges of the page, to allow use of a shear force to commence the separation of the insert from the remainder of the sheet. The stock is preferably 80–100 pound stock; however lighter stocks may be used where the printer does not handle such heavy stocks easily. The stock may be glossy, coated or clay finish.

These and other objects and features of the present invention will become more fully apparent from the following description and appended claims taken in conjunction with the accompanying drawings, in which like numerals refer to like parts.

DETAILED DESCRIPTION OF THE PREFERRED EMBODIMENTS

Figure 1:
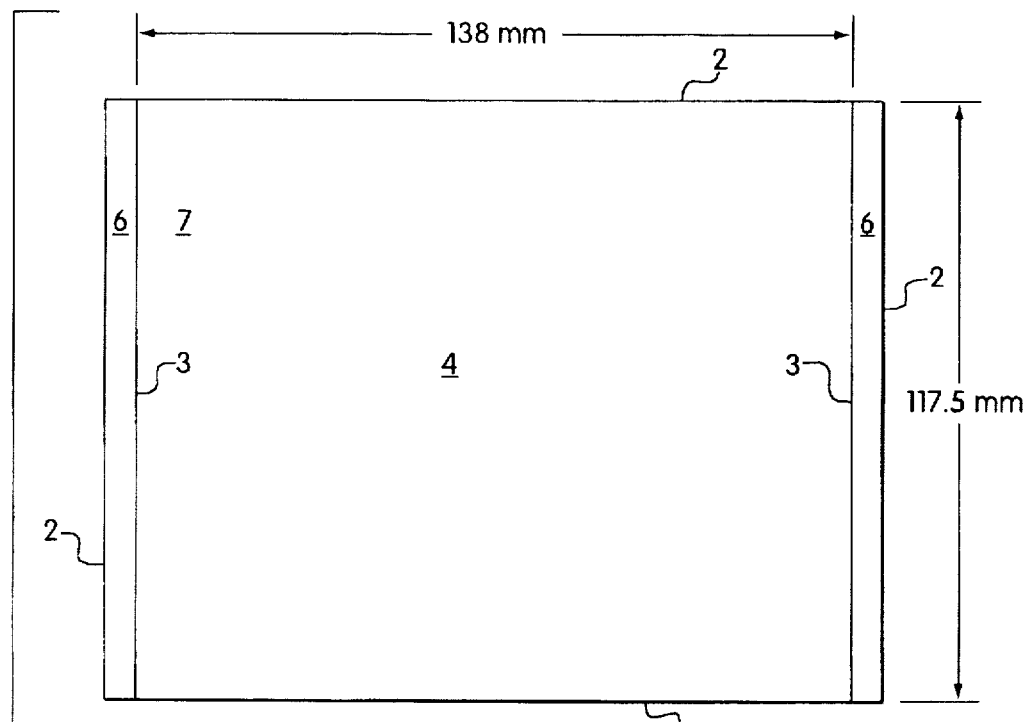
FIG. 1 shows a pair of perforated and scored outlines on a letter size sheet for front and rear inserts for a CD-ROM jewel case according to the present invention.
Figure 1:
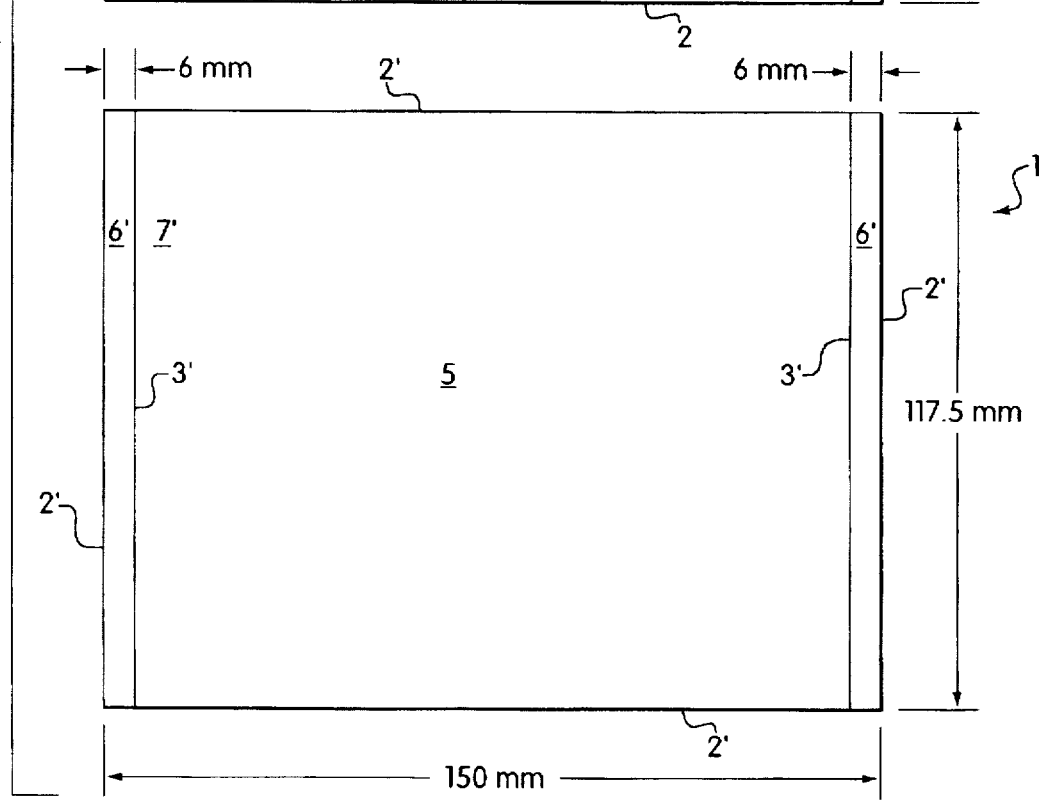

The invention will now be described by way of the drawing, in which corresponding reference numerals indicate corresponding structures in the figure.

FIG. 1 shows a preferred layout of a perforated and scored sheet for printing CD-ROM jewel case front and rear inserts.

A sheet 1 is provided having a defined pattern 2, 2' of reduced strength, allowing separation along the defined pattern 2, 2'. The defined pattern corresponds to an insert for a CD-ROM jewel case (not shown). The sheet 1 is generally paper, but may be any suitable printable media.

The reduced strength pattern 2, 2' is formed by perforation of the sheet 1, such as with a perforation die.

The defined patterns 2, 2' also include a pair of scored lines 3, 3', each of said pair of scored lines 3, 3' defining a folding axis. The folding scores 3, 3' are preferably imposed during the same operation as the perforation.

The sheet 1 preferably corresponds to a standard paper size, and more preferably letter size or A4 size, and most preferably letter size.

As shown in FIG. 1, both the front and rear inserts 4, 5 may be provided on a single sheet 1, laid out as identical defined regions 3, 3', symmetrical about both the vertical and horizontal axis. Thus, the paper orientation is immaterial during printing. Of course, the sheet 1 may be preprinted, in which case the orientation would matter. The sheet 1 is preferably a heavy weight paper, of at least 25 pound and more preferably 80–100 pound stock.

In order to correspond to a CD-ROM jewel case, the dimensions of each pattern are preferably about 150 mm by 117.5 mm.

On order to facilitate folding the edges of the front and rear inserts 4, 5 to fit into the sides of the CD-ROM jewel case, the pattern further includes a pair of scored folding lines 3, 3' to provide three regions, two lateral regions 6, 6' each being about 6mm wide by 117.5 mm long and bounded interiorly by one of said folding lines 3, 3' and a central region 7, 7' being about 138 mm by 117.5 mm and being bounded by both of said folding lines 3, 3'.

Figure 2:
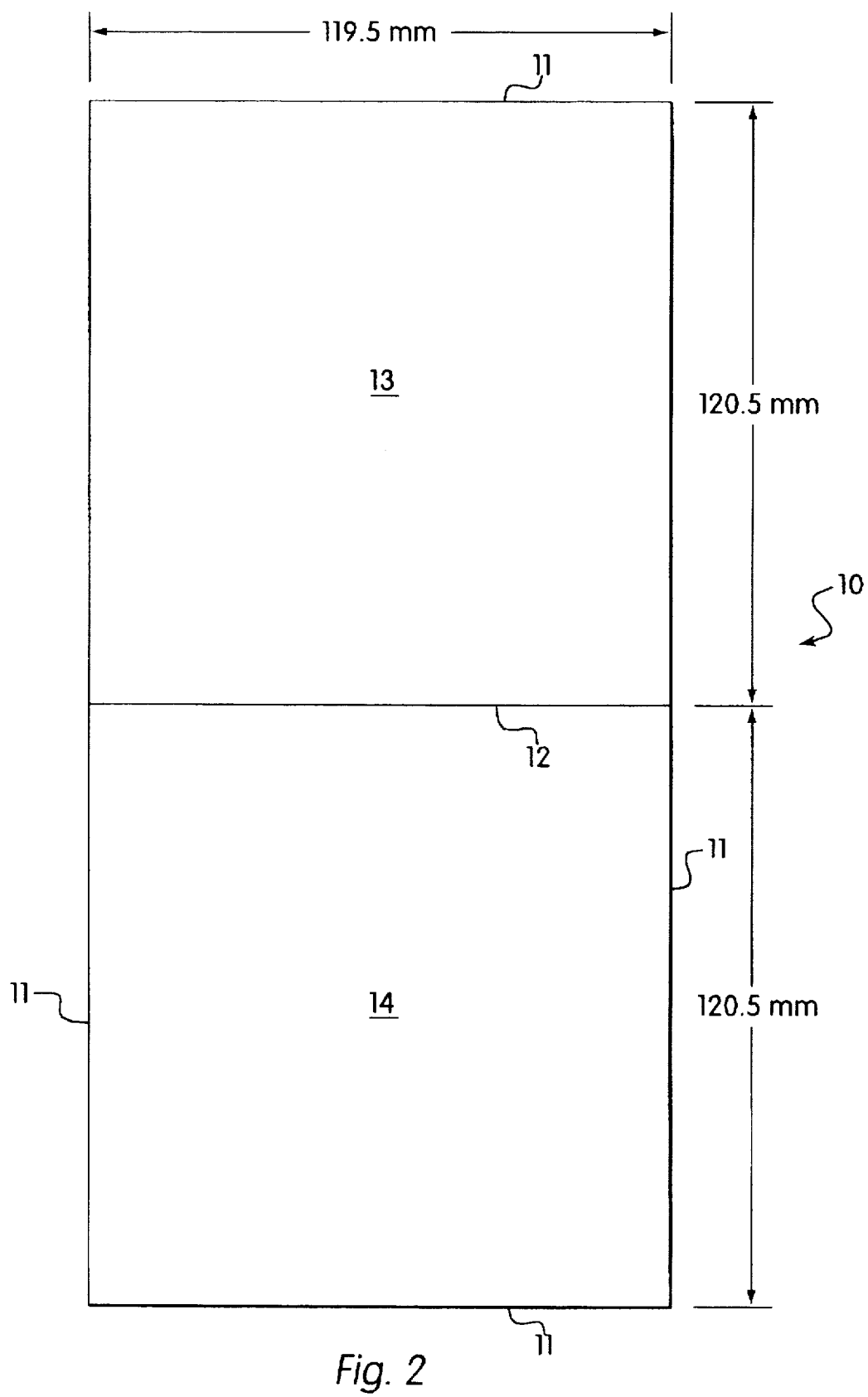
FIG. 2 shows a perforated and scored outline of a CD-ROM jewel case booklet according to the present invention.

As shown in FIG. 2, the present invention also provides a CD-ROM jewel case booklet, as a sheet 10 having a defined pattern 11 of reduced strength, allowing separation along the defined pattern 11. The defined pattern 11 is preferably a perforation pattern, formed in a sheet of paper. In this case, the sheet is preferably at least 25 pound, and more preferably a heavy stock, 80–100 pound stock, for example. The sheet 10 is preferably a standard size sheet, and more preferably letter size or A4 size, and most preferably letter size.

The sheet 10 further includes a scored line 12, defining a folding axis of the booklet.

The booklet is preferably defined as a rectangular pattern 11 having dimensions of about 119.5 mm by 241 mm, with the scored folding line 12 to provide two regions, each being about 119.5 mm wide and 120.5 mm long.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. Consequently, the full scope of the invention should be ascertained by the appended claims.

What is claimed is:

1. A sheet having a defined pattern of reduced strength, allowing separation along said defined pattern, said pattern defining an insert for a CD-ROM jewel case, said pattern being rectangular having dimensions of about 150 mm by 117.5 mm, and further comprising a pair of scored folding lines to provide three regions two lateral regions, each being about 6 mm wide by 117.5 mm long and bounded interiorly by one of said folding lines and a central region being about 138 mm by 117.5 mm and being bounded by both of said folding lines.

2. The sheet according to claim 1, wherein said sheet is formed of paper.

3. The sheet according to claim 1, wherein said defined pattern is formed by perforation of said sheet.

4. The sheet according to claim 1, having letter size dimensions.

5. The sheet according to claim 1, having A4 size dimensions.

6. The sheet according to claim 1, comprising a pair of said defined patterns.

7. The sheet according to claim 6, wherein said pair of defined patterns are identical and arranged symmetrically.

8. A set of sheets, each having a defined pattern of reduced strength, allowing separation along said defined pattern, a first of said defined patterns defining a booklet for a CD-ROM jewel case, having dimensions of about 119.5 mm wide by 241 mm long, having a scored folding line to provide two regions each being about 119.5 mm wide by 120.5 mm long, and a second of said defined patterns defining an insert for a CD-ROM jewel case, having dimensions of about 150 mm by 117.5 mm, having a pair of scored folding lines to provide three regions of each defined pattern, two lateral regions each being about 6 mm wide by 117.5 mm long and bounded interiorly by one of said folding lines and a central region being about 138 mm by 117.5 mm and being bounded by both of said folding lines.

9. The set of sheets according to claim 8, wherein each of said sheets is formed of paper.

10. The set of sheets according to claim 8, wherein each of said defined patterns is formed by perforation of said sheet.

11. The set of sheets according to claim 8, wherein each of said sheets are of letter size dimensions.

12. The set of sheets according to claim 8, wherein each of said sheets are of A4 size dimensions.

13. A sheet having a defined pattern of reduced strength, allowing separation along said defined pattern, said pattern defining an insert for a CD-ROM jewel case, said pattern being rectangular and further comprising a pair of scored folding lines to provide three regions, two lateral regions bounded interiorly by one of said folding lines and a central region being bounded by both of said folding lines, said central region being larger than each of said lateral regions to fit within a space provided in the rear casing of the CD-ROM jewel case.

14. The sheet according to claim 13, wherein said sheet is formed of paper.

15. The sheet according to claim 13, wherein said pattern is formed by perforation of said sheet.

16. The sheet according to claim 13, having letter size dimensions.

17. The sheet according to claim 13, having A4 size dimensions.

18. The sheet according to claim 13, comprising a pair of defined patterns.

19. The sheet according to claim 18, wherein said pair of patterns are identical and arranged symmetrically.

\* \* \* \* \*

(12) EX PARTE REEXAMINATION CERTIFICATE (7855th)
United States Patent
Tracy

(10) Number: US 5,789,051 C1
(45) Certificate Issued: Nov. 9, 2010

(54) PERFORATED STOCK FOR LABELING CD-ROM JEWEL CASE

(75) Inventor: Peter Tracy, Guilford, CT (US)

(73) Assignee: Fellowes, Inc., Itasca, IL (US)

Reexamination Request:
No. 90/010,137, Apr. 8, 2008

Reexamination Certificate for:
Patent No.: 5,789,051
Issued: Aug. 4, 1998
Appl. No.: 08/743,905
Filed: Nov. 4, 1996

(51) Int. Cl.
*G11B 23/38* (2006.01)
*G11B 23/40* (2006.01)
*G11B 33/04* (2006.01)

(52) U.S. Cl. .......................................... 428/43; 428/167
(58) Field of Classification Search ........................ None
See application file for complete search history.

(56) References Cited

U.S. PATENT DOCUMENTS

| | | | | |
|---|---|---|---|---|
| 3,950,870 A | * | 4/1976 | Heegaard | 40/638 |
| 5,379,538 A | * | 1/1995 | Osborne | 40/638 |
| 5,462,783 A | * | 10/1995 | Esselmann | 428/42.1 |
| 5,544,741 A | | 8/1996 | Fantone et al. | |
| 5,580,640 A | * | 12/1996 | Kraft et al. | 428/195.1 |
| 6,068,423 A | * | 5/2000 | Owen | 402/79 |

FOREIGN PATENT DOCUMENTS

GB  2 222 143 A  2/1990

OTHER PUBLICATIONS

Merriam–Webster's Collegiate Dictionary, 10th Edition, Merriam–Webster, Inc., 1993, p. 1194.*
ACE Label Systems, Inc., "For all of your blank and custom label needs" catalog, Nov. 1, 1994, 20 pages, Golden Valley, Minnesota, Graphic Design Y B Limited.

* cited by examiner

*Primary Examiner*—Stephen J Stein

(57) ABSTRACT

A sheet having a defined pattern of reduced strength, allowing separation along said defined pattern, said pattern defining an insert for a CD-ROM jewel case, preferably being a letter size paper sheet, comprising a pair of said defined patterns each being an identical and symmetrically arranged rectangular perforation pattern having dimensions of about 150 mm by 117.5 mm, having a pair of scored folding lines to provide three regions of each defined pattern, two lateral regions each being about 6 mm wide by 117.5 mm long and bounded interiorly by one of said folding lines and a central region being about 138 mm by 117.5 mm and being bounded by both of said folding lines. Also provided is a sheet having a defined pattern of reduced strength, allowing separation along said defined pattern, said pattern defining a booklet for a CD-ROM jewel case, which preferably includes a centered rectangular perforation pattern having dimensions of about 119.5 mm wide by 241 mm long, having a scored folding line to provide two regions each being about 119.5 mm wide by 120.5 mm long.

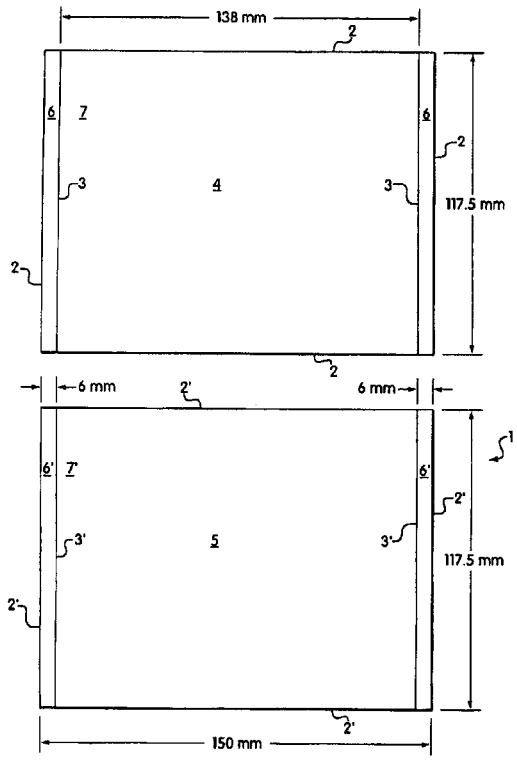

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-19 are cancelled.

* * * * *